Patented Nov. 6, 1934

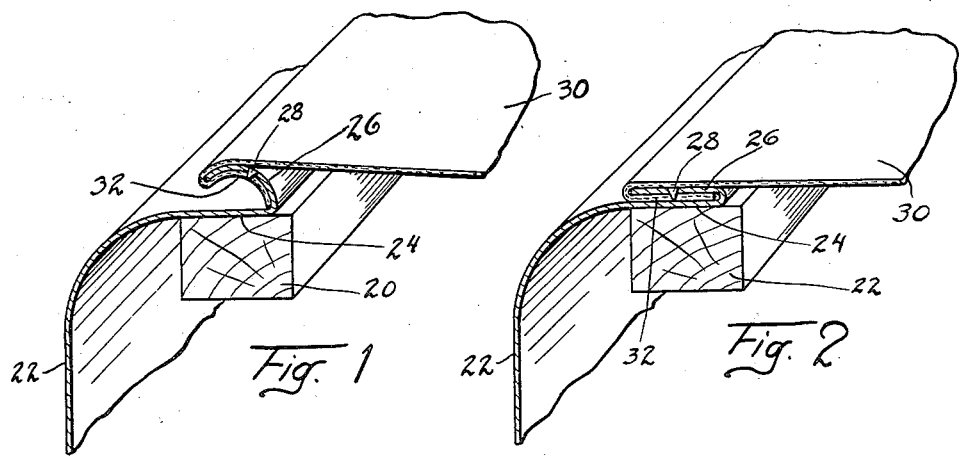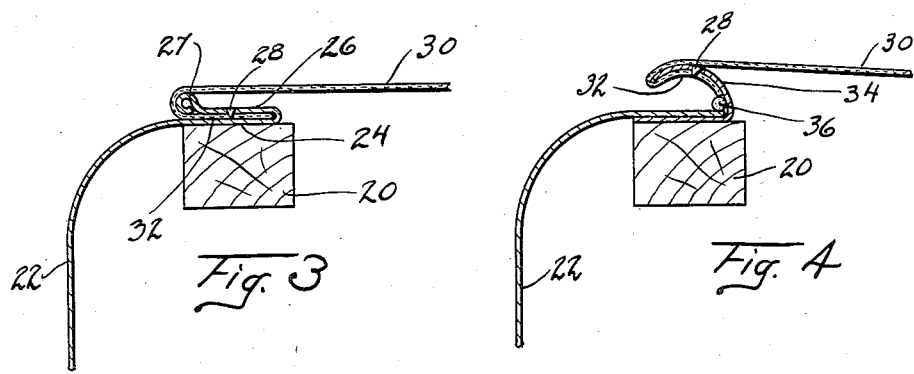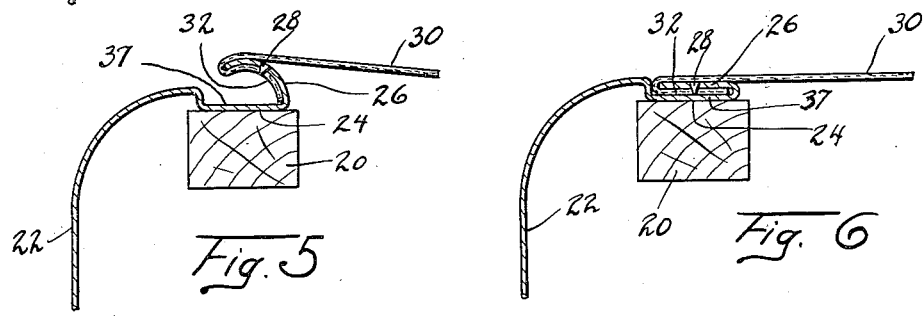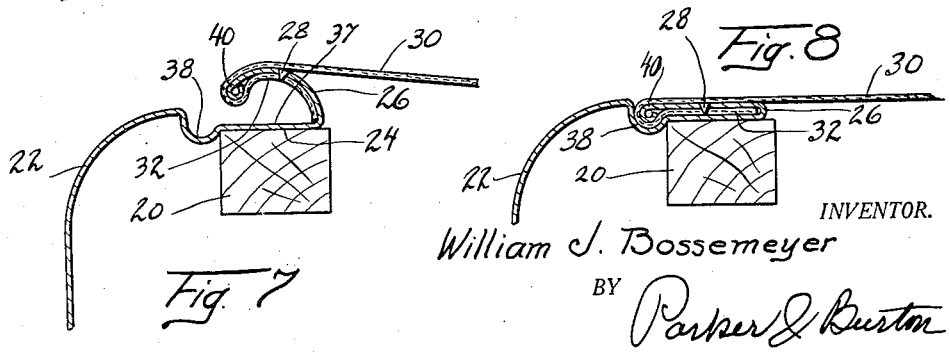

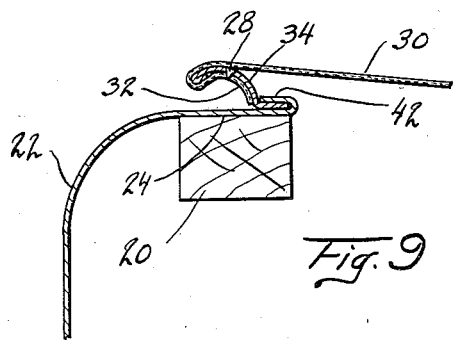
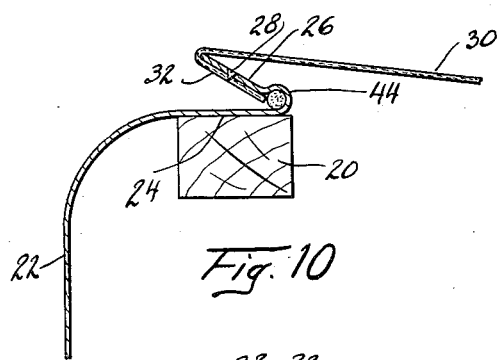
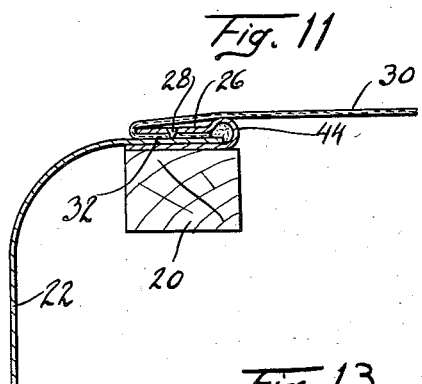
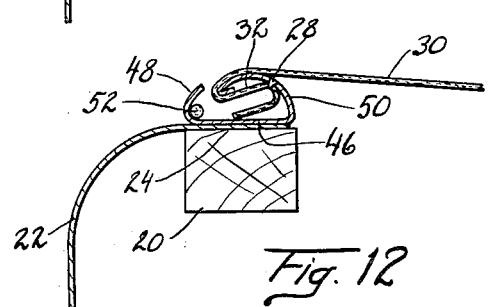
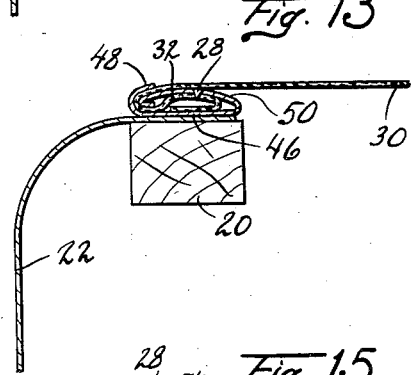
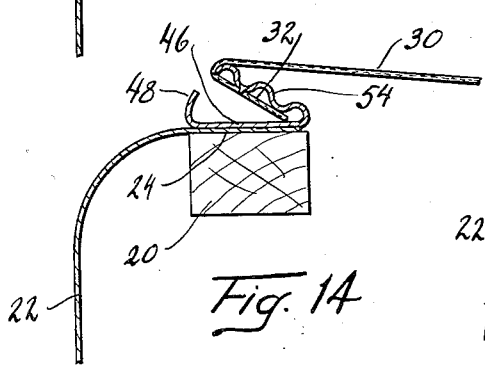
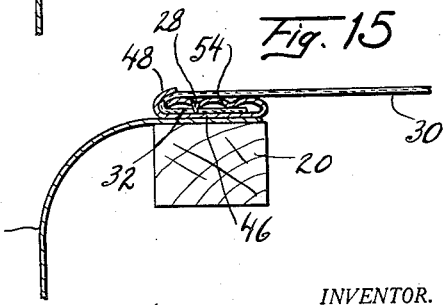

1,979,858

UNITED STATES PATENT OFFICE 1,979,858

AUTOMOBILE TOP AND THE METHOD OF ITS CONSTRUCTION

William J. Bossemeyer, Detroit, Mich.

Application March 24, 1930, Serial No. 438,346

12 Claims. (Cl. 296—137)

My invention relates to improvements in the manufacture of automobile bodies and particularly the top structure thereof.

It relates to an improved top construction and also to an improved method of manufacturing the same. It is customary, at the present time, to provide a vehicle top which includes top covering material which is stretched across the top and held in place along its sides by various means, and my invention resides in providing improved means for securing the covering material in place and an improved method for accomplishing this object.

A paramount feature consists in providing means which embodies the fastening of the top covering material readily in place and facilitates performing this function and provides a secure joint, all of which can be accomplished by the ordinary workman expeditiously and with the use of ordinary tools. Furthermore, my improved construction is of such a character that the joint formed between the securing means and the top covering material is not only weatherproof and attractive in appearance but does not necessitate the employment of auxiliary welt or bead members to cover the same.

In the drawings various embodiments of my invention are illustrated which show several modified forms of construction which permit the accomplishment of the specified object and a more complete understanding of these and of the various advantageous features of the invention will be evident from the following specification and appended claims.

In the drawings,

Figs. 1 and 2 are fragmentary perspectives illustrating one preferred embodiment showing means for securing the top covering material in position, Fig. 3 is a fragmentary section illustrating a second embodiment of my invention, Fig. 4 illustrates a third embodiment of my invention, Figs. 5 and 6 illustrate another embodiment of my invention, Figs. 7 and 8 are fragmentary sectional views illustrating an additional embodiment of my invention, Fig. 9 illustrates another embodiment of my invention.

Figs. 10 and 11 illustrate an additional embodiment of my invention,

Figs. 12 and 13 illustrate another embodiment of my invention, and

Figs. 14 and 15 illustrate an additional embodiment of my invention.

The several figures of the drawings illustrate merely the securing means and a portion of the top structure along one side and it will be understood that the securing means on the opposite side of the top may be of the same character and that, of course, the top will be suitably secured in place entirely about its margin.

In the various figures of the drawings a top frame member is illustrated as 20. This may be the usual side rail member extending from front to rear, and 22 indicates the metal side wall which is turned over the top of the member 20 as at 24. In Figs. 1, 2, 3, 5, 6, 7, 8, and 10 this sidewall member 22 is shown as terminating in an outwardly extending arcuate deformable flange 26, which is preferably provided with interiorly extending projections, or teeth, 28. The top covering material 30 is folded over the edge of this flange as at 32. In Fig. 1 the structure is shown in the condition it would occupy after the covering material was folded over the edge of the flange and before the flange was bent downwardly to secure the covering material in place. The flange 26 is then bent down as shown in Fig. 2 and this secures the covering material in position and at the same time stretches the covering material because of the outward movement of the margin of the flange, which outward movement is increased substantially by virtue of the straightening out of the curvature of the arcuate flange during the bending down operation. This straightening out of the curvature of the flange is a material element in my invention.

In the remaining figures of the drawings the construction is very similar except for variations in detail.

In Fig. 3 the flange 26 is shown as provided with a marginal bead 27 which, when the covering material is secured in place, supports the covering material 30 as shown in Fig. 3 slightly above that portion of the top arranged immediately thereunder.

In Fig. 4 the construction is the same as in Fig. 1 except that the securing flange is formed as a separate strip here indicated as 34 which is secured in a suitable manner to the rail 20 below the overhanging portion 24 of the side wall and there is also shown a ribbon or strip of cement 36 which may be laid as indicated to assist in fastening the covering material in place.

In Figs. 5 and 6 the construction is again similar except that the side wall member 22 is provided above the frame member 20 with the recess or depression 37 into which the flange 26 is bent as shown in Fig. 6, thereby making a flush joint as indicated.

In Figs. 7 and 8 the construction is similar except that the recess shown in Figs. 5 and 6 is provided with a channel or groove 38, and the flange is provided with a marginal bead 40 which upon the bending down of the flange supports the groove 38 as indicated in Fig. 8, again forming a flush joint as shown in Fig. 6.

In Fig. 9 the construction is similar to that of Fig. 4 except that the flange member 34 is secured to the side 22 by having the side wall member bent thereover as indicated at 42. It is understood that this flange member would be bent down against the side wall member 22 as heretofore described to secure the covering material in position.

In Figs. 10 and 11 the flange is somewhat differently formed in that it is not broadly arcuate in cross section but is provided with a tubular bead 44 at the angle of the flange and the covering material 30 is folded over the edge of the flange as heretofore described, but upon the bending down of the flange pressure applied to the bead 44 will tend to force the flange outwardly and also to hold the flange downwardly against the side wall member 22. In Fig. 11 this flange member is shown as separate from the side wall member while in Fig. 10 it is integral therewith.

Figs. 12 and 13 illustrate the open and closed positions respectively and wherein the flange member is shown as a channel member having a base 46 and opposed overhanging side walls 48 and 50 which form deformable flanges and the covering material 30 is folded over the edge of the wider flange 50 as heretofore described. In Fig. 12 there is also shown a cement ribbon 52 arranged as illustrated. In this construction the large flange is bent down into the channel underneath the other flange and secures the covering material in place therein and the other flange may then be forced down thereover to the position shown in Fig. 13.

In Figs. 14 and 15 I have shown another modified form wherein flange is corrugated as at 54, and when it is bent downwardly underneath the opposite flange 48 the corrugations are partially flattened out and during this flattening out process the covering material is stretched taut as indicated.

What I claim:

1. In vehicle top construction, means arranged along one side to secure the top covering material in place along said side including a member having a recess and a flange overhanging the same, top covering material folded over said flange, said flange including an arcuate portion and being turned down into said recess with the arcuate portion flattened out holding the covering material taut and in place to form a flush joint.

2. In vehicle top construction means arranged along one side to secure the top covering material in place along said side including a pair of opposed flanges arranged along said side, one flange being substantially wider than the other and including an arcuate portion formed of deformable metal, top covering material folded over the edge of said wide deformable flange, said wide flange being turned down with its margin disposed underneath the other flange and the arcuate portion thereof flattened out securing said top covering material in place.

3. In vehicle top construction means arranged along one side to secure the top covering material in place along said side including a member provided with a corrugated deformable metal flange, top covering material folded over the edge of said flange, said flange being turned down against the said member with the corrugations flattened out stretching said covering material taut and holding the same in place.

4. That method of securing top covering material in place on a vehicle top including providing a top supporting member extending along one side of the top and having an arcuate deformable metal flange extending along one edge of the top folding the top covering material thereover, bending said arcuate flange downwardly against the frame and straightening out the curvature thereof during the bending down operation to stretch the covering material across the top.

5. That method of securing top covering material in place on a vehicle top including providing a top supporting member extending along one side of the top and having an arcuate deformable metal flange extending along one edge of the top, said supporting member having a recess extending along an edge adjacent to said flange, folding the top covering material over the top of said flange bending said flange into said recess and straightening out the curvature thereof to stretch the covering material taut and to hold the same against one side wall of the recess securely in place.

6. That method of securing top covering material in place on a vehicle top including providing a top supporting member extending along one side of the top having an arcuate deformable metal flange extending along one edge of the top, said supporting member having a recess extending along the edge adjacent to said flange, folding the top covering material over the edge of said flange, said flange having a bead along its margin, bending said flange downwardly and straightening out the curvature thereof so that the bead engages within said recess and holds the top covering material securely in place and stretches the same across the top.

7. That method of fastening top covering material in place on a vehicle top which includes providing supporting means extending along one side of the top comprising a supporting member having a pair of opposed deformable metal flanges, one flange being substantially wider than the other and corrugated longitudinally folding the top covering material over said corrugated flange, bending said corrugated flange downwardly against said supporting member with its margin disposed underneath the other flange, and flattening out the corrugations of said flange to stretch the covering material taut and hold the same securely in place.

8. That method of fastening top covering material in place on a vehicle top which includes providing a supporting metal channel member extending along one side of the top and having arcuate side walls overhanging the bottom of the channel and forming deformable flanges, folding the top covering material over the edge of one of said flanges, bending said flange downwardly against the bottom of the channel with the edge disposed underneath the other flange to stretch the said covering material taut and hold the same securely in place.

9. That method of securing top covering material in place on a vehicle top having a top frame member and a metal side wall turned inwardly thereover comprising providing on said side wall an outwardly turned arcuate deformable flange overhanging the inwardly turned portion of the side wall, folding the top covering material over said flange, bending said flange down against the side wall, straightening out the curvature thereof to stretch the material taut and hold the same securely in place.

10. That method of securing top covering material in place on a vehicle top having securing means extending along one side and comprising a member extending along said side provided with an outwardly turned flange including a deformable arcuate portion which includes folding the covering material over said flange and bending the flange down against the said member securing the covering material in place and stretching the same taut.

11. A method of securing top covering material to a supporting member having a flexible flange extending therealong and secured thereto which consists in deforming the flange into an arcuate position, rolling the material over the edge of the flange and securing it to the under side of the arc, and flattening out the flange to clamp the material upon the supporting member and stretch it.

12. That method of securing top covering material in place on a vehicle top including providing a top supporting member extending along one side of the top and a flange having an arcuate deformable portion extending along one edge of the top, folding the top covering material over the flange, bending said flange downwardly and straightening out its arcuate portion, stretching the covering material taut across the top and securing the same in place.

WILLIAM J. BOSSEMEYER.